United States Patent [19]
Sölve et al.

[11] Patent Number: 5,854,784
[45] Date of Patent: Dec. 29, 1998

[54] POWER-SAVING METHOD FOR PROVIDING SYNCHRONIZATION IN A COMMUNICATIONS SYSTEM

[75] Inventors: Torbjörn Wilson Sölve, Cary; Larry William Massingill, Selma, both of N.C.

[73] Assignee: Ericsson, Inc., Research Triangle Park, N.C.

[21] Appl. No.: 743,189

[22] Filed: Nov. 5, 1996

[51] Int. Cl.$^6$ .............................. G08C 17/00; H04J 3/06
[52] U.S. Cl. ...................... 370/311; 370/337; 370/350
[58] Field of Search ................... 370/311, 312, 370/314, 318, 321, 324, 337, 347, 350, 442, 503, 552, 252, 522, 326, 329, 336; 455/38.3, 434, 515, 522, 427

[56] References Cited

U.S. PATENT DOCUMENTS

| | | | |
|---|---|---|---|
| 4,964,121 | 10/1990 | Moore | 370/311 |
| 5,095,530 | 3/1992 | Tanaka et al. | 455/434 |
| 5,150,361 | 9/1992 | Wieczorek et al. | 370/311 |
| 5,199,031 | 3/1993 | Dahlin | 455/515 |
| 5,373,506 | 12/1994 | Tayloe et al. | 370/311 |
| 5,459,457 | 10/1995 | Sharpe | 370/311 |
| 5,570,369 | 10/1996 | Jokinen | 370/311 |
| 5,742,909 | 4/1998 | Uchida et al. | 370/311 |

OTHER PUBLICATIONS

European Telecommunication Standard (GSM 05.02), May 1994.

European digital cellular telecommunications system (Phase 2); Multiplexing and multiple access on the radio path (GSM 05.02), European Telecommunication Standard Institute, 1994.

*Primary Examiner*—Chau Nguyen
*Assistant Examiner*—Soon-Dong Hyun
*Attorney, Agent, or Firm*—Burns, Doane, Swecker & Mathis, L.L.P.

[57] ABSTRACT

A power saving method for maintaining synchronization in a power-limited communication system, such as a satellite-based TDMA mobile radiocommunication system. According to exemplary embodiments, the satellite transmits abbreviated bursts containing only synchronization information during intervals when no other control information is required by the receiving mobile unit, reducing power consumption during these intervals.

19 Claims, 6 Drawing Sheets

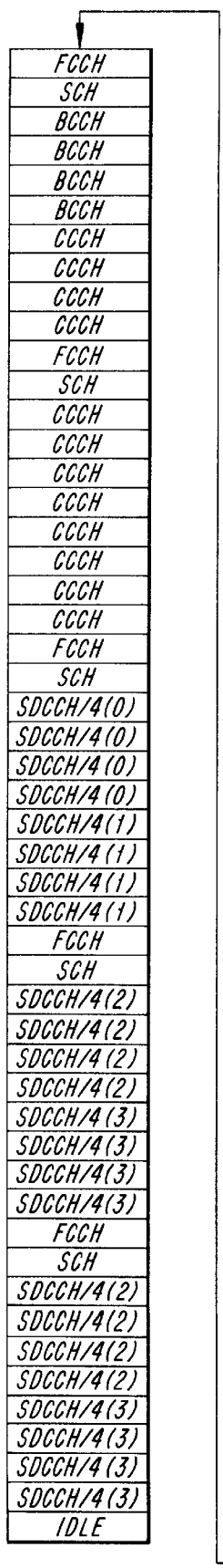
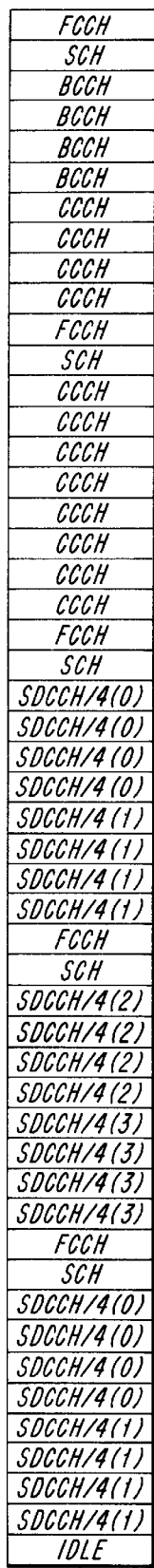
FIG. 3A
FIG. 3B
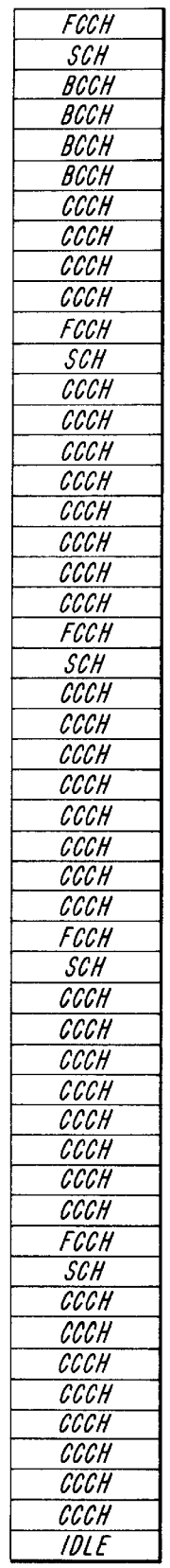

FIG. 6

| FRAME # | 0 | 1 | 2-5 | 6-9 | 10 | 11 | 12 | 13-16 | 17-20 | 21-24 | 25 | 26-29 | 30-33 | 34-37 | 38 | 39 | 40-43 | 44-47 | 48 | 49 | 50 |
|---|---|---|---|---|---|---|---|---|---|---|---|---|---|---|---|---|---|---|---|---|---|
| SLOT 0 | H | S | SBCCH | SCCCH | I | I | H | SCCCH | SCCCH | SCCCH | H | SCCCH | SCCCH | SCCCH | I | H | SCCCH | SCCCH | I | I | I |
| SLOT 1 | | | | | | | | | | | | | | | | | | | | | |
| SLOT 2 | | | | | | | | | | | | | | | | | | | | | |
| SLOT 3 | | | | | | | | | | | | | | | | | | | | | |
| SLOT 4 | | | | | | | | | | | | | | | | | | | | | |
| SLOT 5 | | | | | | | | | | | | | | | | | | | | | |
| SLOT 6 | | | | | | | | | | | | | | | | | | | | | |
| SLOT 7 | | | | | | | | | | | | | | | | | | | | | |
| SLOT 8 | | | | | | | | | | | | | | | | | | | | | |
| SLOT 9 | | | | | | | | | | | | | | | | | | | | | |
| SLOT 10 | | | | | | | | | | | | | | | | | | | | | |
| SLOT 11 | | | | | | | | | | | | | | | | | | | | | |
| SLOT 12 | | | | | | | | | | | | | | | | | | | | | |
| SLOT 13 | | | | | | | | | | | | | | | | | | | | | |
| SLOT 14 | | | | | | | | | | | | | | | | | | | | | |
| SLOT 15 | | | | | | | | | | | | | | | | | | | | | |

POWER-SAVING METHOD FOR PROVIDING SYNCHRONIZATION IN A COMMUNICATIONS SYSTEM

FIELD OF THE INVENTION

The present invention relates to a power-saving method of providing synchronization information to communication devices in a communications system. More particularly, the present invention reduces power consumption in a satellite-based communications system by transmitting abbreviated bursts containing only synchronization information during intervals when no other control information is needed.

BACKGROUND OF THE INVENTION

In existing cellular TDMA standards such as GSM and DAMPS, control channel(s) continuously transmit data such as synchronization information, signal strength measurements of the control channels of adjacent cells, paging information, and access grant in formation.

It has been suggested to acquire and maintain synchronization between a satellite communications system and terminal equipment by transmitting information in bursts on a defined control channel and integrating correlations with consecutive known training sequences. This method achieves accurate performance under conditions with poor signal-to-noise ratios.

In a digital satellite communications system, the cost of a satellite increases with its ability to provide a higher link margin (higher signal gain) for both forward and return traffic. Higher signal gain can be achieved by enhancing the satellite antenna to increase both the received and transmitted signal levels. Unfortunately, the higher the antenna gain the larger the antenna size. A larger antenna causes increased mass and therefore requires increased power on board the satellite to keep it under control. Higher signal levels may also be achieved by increased output power.

Since increased power consumption tends to increase system cost, particularly for satellite-based systems, it is important to minimize power consumption.

According to the well-known Global System for Mobile communications (GSM) Standard, a number of carriers, each separated by 200 kHz, carry digital voice, data and fax information. Each carrier is shared by a number of users according to Time Division Multiple Access (TDMA) technique. In GSM, a carrier is divided in time, into so called TDMA frames. Each TDMA frame is split into 8 TDMA slots which each contain 156.25 bits or symbols. The symbol rate in GSM is $13\times10^6/48=270.83\times10^3$ symbols/s. Hence, a TDMA slot spans approximately 577 us and a TDMA frame approximately 4.62 ms.

A normal TDMA burst, shown in FIG. 1, is transmitted within a TDMA slot and contains two data fields of 57 symbols each. The burst also includes two tail bit fields during which the transmitter output power is ramped up (beginning of burst) or down (end of burst). In the middle of the burst is a synchronization, or training sequence field. This field allows the receiver to maintain accurate timing and estimate RF channel conditions to compensate for impairments.

For a mobile unit to initially acquire system timing, the GSM system provides so called Frequency Correction (FCCH) and Synchronization (SCH) bursts. The FCCH burst contains a symbol pattern of all 1's. The structure of an SCH burst is shown in FIG. 2. The SCH burst includes a 64-symbol training sequence, along with two 39-symbol fields of additional data. FCCH and SCH bursts, like all bursts in the GSM system, fit within a TDMA slot.

GSM is a TDMA/FDMA system where each carrier includes a number of logical channels. These logical channels include control and traffic channels. Control channels primarily carry signaling information and traffic channels primarily user data. Each logical channel is assigned a specific set of TDMA frames and a specific timeslot (between 0 and 7, where 8 slots form a TDMA frame) on a given carrier. 51 control channel frames, numbered from 0 to 50, form a control channel multiframe (MF). The logical channel structures are repeated for each MF.

A control channel carrier in GSM can be constructed in a number of different ways by a combination of these logical channels. For any control channel carrier timeslot 0 is always the first timeslot to carry control channel data and it is only in timeslot 0 that FCCH and SCH bursts appear. If more control channels are desired on the carrier, additional timeslots may be assigned. Two exemplary control channel structures are shown in FIGS. 3A–3B. The definition of these structures may be found in the ETSI GSM recommendation 05.02. The ETSI GSM recommendations are incorporated by reference herein.

When a GSM mobile unit is powered on, one of its first actions is to locate the FCCH burst. As a result of the GMSK differentially encoded modulation scheme used in GSM, a carrier shift of 200 KHz/3 is generated during FCCH burst to facilitate detection by the mobile unit.

Once the mobile unit identifies the timing position of the FCCH burst, the complete control channel MF (timeslot 0) may be identified with limited accuracy. Directly following the FCCH frame in the MF structure is the SCH frame which provides means to acquire accurate timing to the bit or symbol level. The timing is achieved by correlating a received digitized stream of samples to a known 64-symbol training sequence as shown in FIG. 2. The digitized sample stream is typically represented by in-phase (I) and quadrature phase (Q) components as is well-known in the art. This correlation is typically performed by a suitable digital signal processing means in a digital ASIC, or a general purpose digital signal processor. A block diagram of an exemplary GSM receiver is shown in FIG. 4. The receiver includes filters, amplifiers, and oscillators as shown to produce received signal strength indication (RSSI) signals necessary to determine the power profile, and thereby achieve coarse synchronization. The receiver also includes means to extract phase information from the incoming signal. Typically at some point in the receiver, the signal is represented by I and Q components, as described above. This conversion is easily performed from a log polar (amplitude and phase) representation of the sampled signal. The synchronization process will be described in more detail below.

The GSM system is a cellular system where "cells" are serviced by a number of base stations which each cover a desired service area. RF signals are transmitted from these base stations to mobile units which in turn transmit directly to a base station which covers the area where the mobile unit is currently located.

Such cellular base stations typically have access to virtually unlimited power resources. There is, in such systems, little incentive to minimize the transmitted power from these base stations to reduce power consumption. However, it may be of interest to limit the power radiated by the base station in order to minimize interference with adjacent cells.

In a typical satellite communications system, as shown in FIG. 5, the GSM terminal synchronization concept can be improved upon. It has been suggested to achieve synchronization using a scheme in which the forward link (Network Control Center=>Satellite=>Terminal) has the same channel spacing, symbol rate and burst size as in GSM. Terminal synchronization is performed in two steps, coarse and fine synchronization.

Coarse synchronization is acquired by creating a power profile of a given carrier. The satellite system transmits a few bursts in a control channel multiframe at higher power level than the remainder of the bursts (e.g., 7 dB higher for 4 of 816 bursts). By reading the RSSI (Received Signal Strength Indication) level (sampled, e.g., 4 times per burst), the power profile of the carrier can be determined, enabling the mobile unit to achieve a timing accuracy of approximately ¼ of a burst. The 4 high power bursts can be mapped onto the control channel MF asymmetrically, such as shown in FIG. 6. More particularly, FIG. 6 shows the contents of slot 0 in each of a series of frames 0–50. Each slot is identified as a high power slot H, a synchronization burst S, a satellite broadcast control channel SBCCH, a satellite common control channel SCCCH, or an idle burst I.

Preferably, the power profile is acquired over multiple control channel multiframes. By detecting the optimum power "comb" (best match with the expected power profile), coarse timing of the MF structure may be achieved by the mobile unit.

The mobile unit then acquires fine synchronization by calculating bit-level correlations with known training sequences for the SBCCH (Satellite Broadcast Channel) and SCCCH (Satellite Common Control Channels) logical channels. The bursts for these channels are substantially the same as the normal GSM bursts shown in FIG. 1. Due to the poor link margin and the relatively short length of the training sequences, correlations are preferably accumulated over several bursts.

To maintain synchronization, the SBCCH and SCCCH bursts are always transmitted in a typical satellite system. The SBCCH channel carries broadcast information and is always transmitted at given points within the MF. The SCCCH channel carries either SAGCH (Satellite Access Grant Channel) or SPCH (Satellite Paging Channel) information. The information on these channels is in principle only required when a mobile unit is being paged or is being granted access to the system. The terminal must, however, always be provided a valid signal for proper synchronization. This means that the satellite system is always required to transmit all defined bursts for the control channels on timeslot 0, except the ones defined as idle. The mobile unit may then use any of these bursts for proper synchronization. Without this requirement, the mobile unit would attempt correlating to noise when no SCCCH information would be available, and would be unable to achieve fine synchronization.

As stated previously, in a system with limited power resources, such as a satellite communications system, minimizing power consumption is highly desirable. Base stations in such a system include Gateways (for Traffic channels) and Network Control Centers (for Control channels), which do not communicate directly with mobile units. The system instead uses a satellite to allow RF signals to reach their destination. Such a system provides more economical coverage of a large service area than a cellular system, assuming a relatively low user density.

It would be desirable to provide a method for reducing power consumption in power-limited communications equipment.

It would further be desirable to provide a method for maintaining synchronization which reduces the power consumption of power-limited communications equipment.

It would further be desirable to provide a power-saving method for maintaining synchronization which is suitable for use in a satellite-based mobile communications system.

SUMMARY OF THE INVENTION

When no paging or access grant messages are necessary, the only reason for the system (including the satellite) to send the SCCCH information is to provide fine synchronization means to terminals. Since the only portion of these bursts that is used for synchronization is the training sequence, the bursts could be abbreviated to include only the training sequence. When paging and/or access grant messages are needed, normal bursts are transmitted.

The method of the present invention can result in a power savings in timeslot 0 for up to 36 of 51 frames in a MF.

The present invention allows a power-limited communication device, (e.g., the space segment of a digital satellite communications system) to provide synchronization information without continuous transmission. If, in the communications system, there is no demand for signal strength measurements in adjacent cells, the power-limited device needs only to transmit the actual training sequence, rather than the complete bursts, for the frames where no paging or access grant is needed. The proposed scheme allows the power-limited device to ramp up and down directly before and after the training sequence and turn off its transmitter for the remainder of the slot.

BRIEF DESCRIPTION OF THE DRAWINGS

The present invention will be understood more clearly upon reading the following Detailed Description of the Preferred Embodiments in conjunction with the accompanying drawings, in which like reference indicia indicate like elements, and in which:

FIGS. 3A–3B shows exemplary control channel structures suitable for communicating control information in a GSM system;

FIG. 6 shows an exemplary control channel structure for a satellite-based telecommunications system;

DETAILED DESCRIPTION OF THE PREFERRED EMBODIMENTS

According to the present invention, a power limited communication device (e.g., the space segment of a digital satellite communication system) can provide synchronization information without continuous transmission. Thus, if there is no demand in the communication system for signal strength measurements in adjacent cells, the power-limited device need only transmit the actual training sequence, rather than complete bursts, during frames in which no paging or access grant information is needed. The power-limited device can ramp up and down before and after the training sequence and keep its transmitter powered down for the remainder of the slot.

Figure 1:
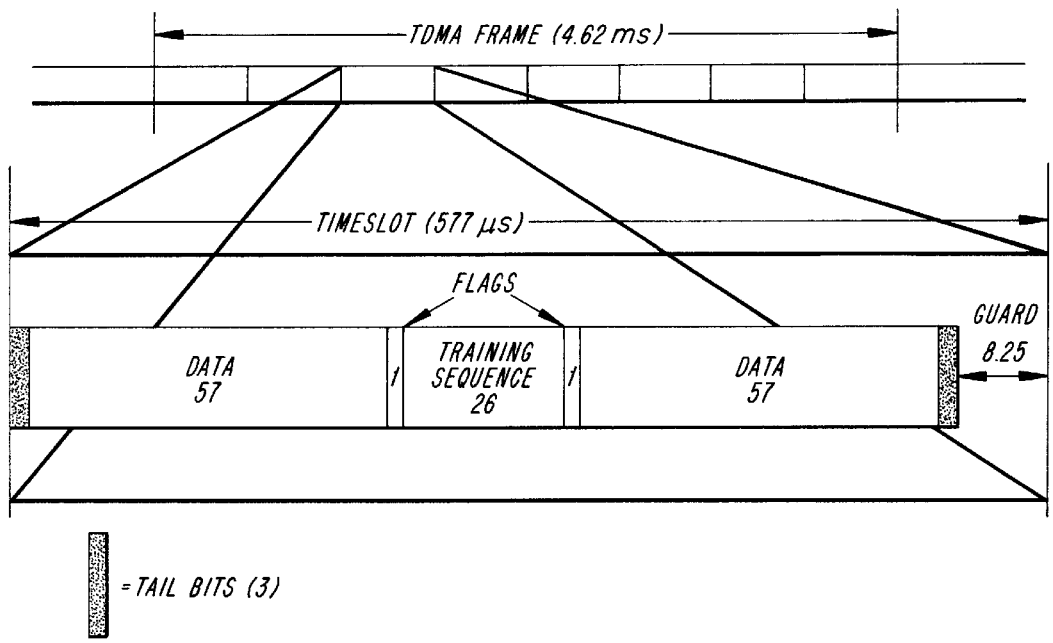
FIG. 1 shows a normal TDMA frame structure and burst according to the GSM standard.
Figure 2:
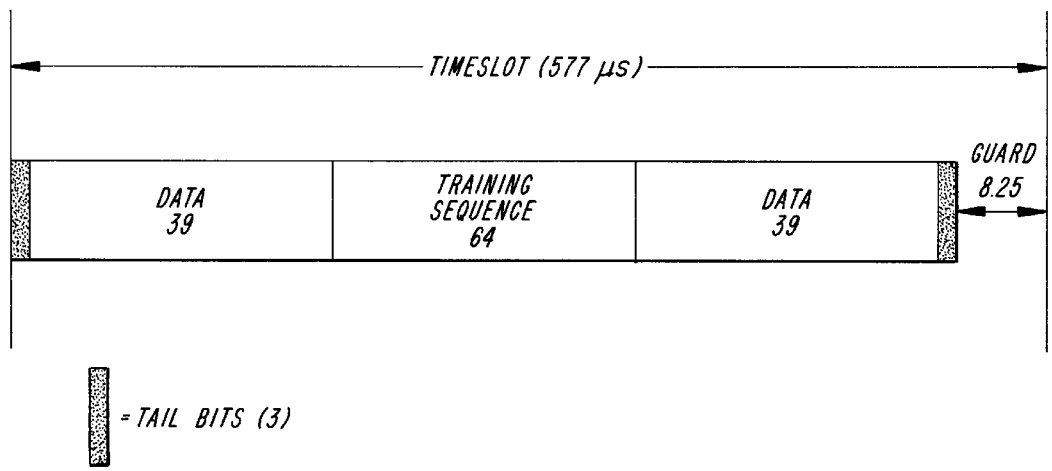
FIG. 2 shows a synchronization channel burst according to the GSM standard.
Figure 4:
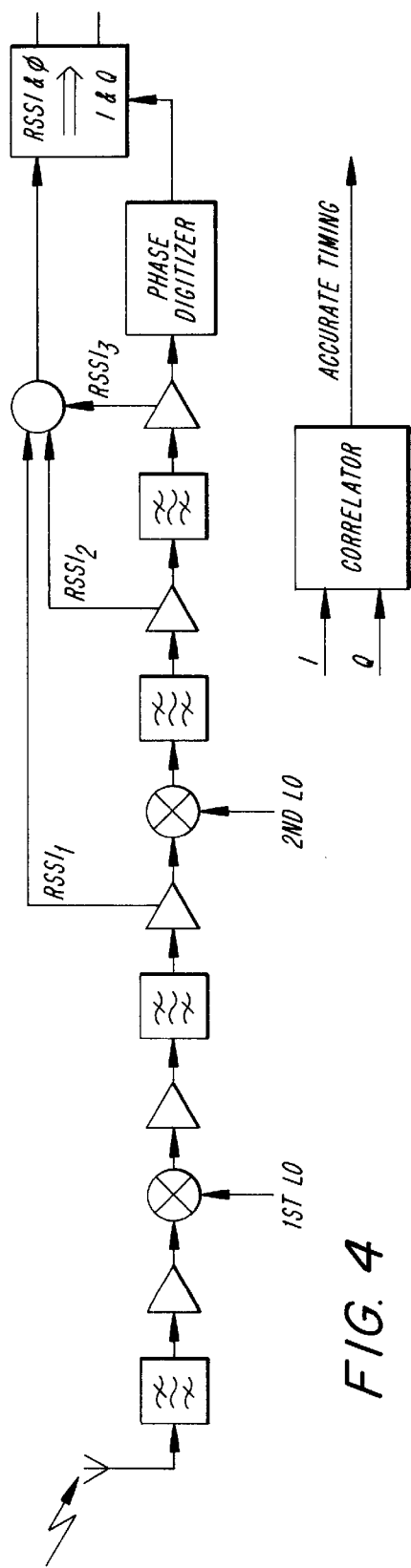
FIG. 4 is a block diagram of an exemplary GSM receiver.
Figure 5:
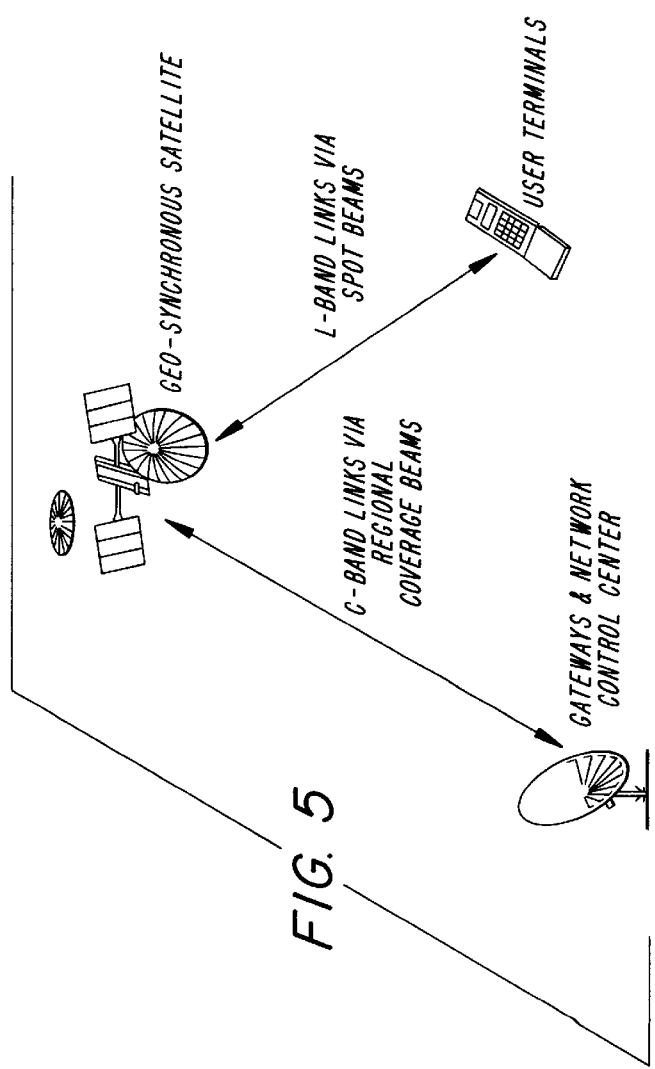
FIG. 5 shows an exemplary satellite-based telecommunications system suitable for implementing the present invention.
Figure 7:
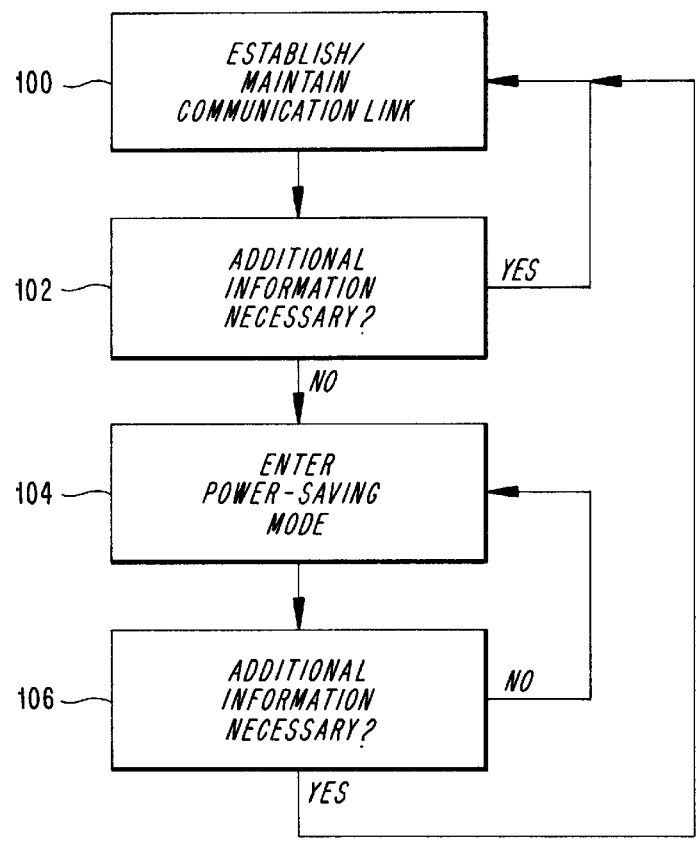
FIG. 7 is a flow chart describing an exemplary method according to the present invention.

Referring now to FIG. 7, a flow chart describing a synchronization method according to the present invention is shown. According to the method, in step 100, a TDMA communications link is established and maintained between a control station, such as a satellite, and a transmitter/receiver, such as a mobile telecommunications terminal. The TDMA communications link is a conventional TDMA communications link, and includes one or more control channels for exchanging control information which includes synchronization information along with some additional control information between the control station and the transmitter/receiver. For example, the control channels can include the SBCCH and/or SCCCH channels, which carry synchronization, broadcast control information, access grant information, and paging information. In the course of establishing the communications link in step 100, the transmitter/receiver acquires coarse synchronization (using known techniques such as the power profile method described earlier) and fine synchronization. While the communication link is maintained, normal TDMA bursts as shown in FIG. 1 are exchanged between the control station and the transmitter/receiver.

In step 102, it is determined whether the additional (e.g., paging or access grant) information is necessary. If necessary, the communications link established in step 100 is maintained and the additional information is exchanged as necessary. If the additional control information is not necessary, then the communication system enters a power-saving mode in step 104. In the power-saving mode, the control station transmits abbreviated bursts which include only the training sequence. In the power-saving mode of step 104, the transmitter/receiver is able to maintain fine synchronization because the abbreviated bursts contain all necessary fine synchronization information.

In step 106, it is determined whether the additional control information is necessary. For example, after some period of time operating in the power-saving mode of step 104, it may be necessary to transmit paging information from the control station to the transmitter/receiver. If additional control information is necessary, the method returns to step 100, and normal bursts are exchanged as necessary. If no additional control information is necessary, the process returns to step 104, and the system continues to operate in the power-saving mode.

Figure 8:
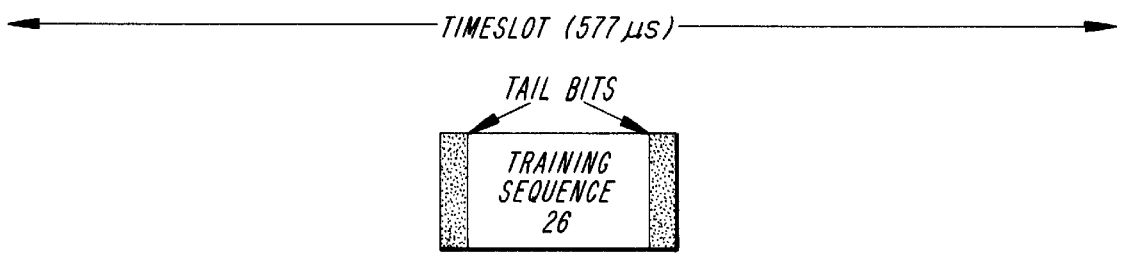
FIG. 8 is an exemplary abbreviated burst according to an embodiment of the present invention.

Referring now to FIG. 8, an abbreviated burst such as is transmitted during the power-saving mode is shown. As can be seen from FIG. 8, the abbreviated bursts includes only a training sequence necessary for the transmitter/receiver to maintain fine synchronization, along with tail bits as necessary. It will be appreciated that the abbreviated burst may include a GSM training sequence or some other training sequence (e.g., a training sequence having a reduced number of symbols). During the remainder of the burst, the transmitter is powered down to save power.

Figure 9:
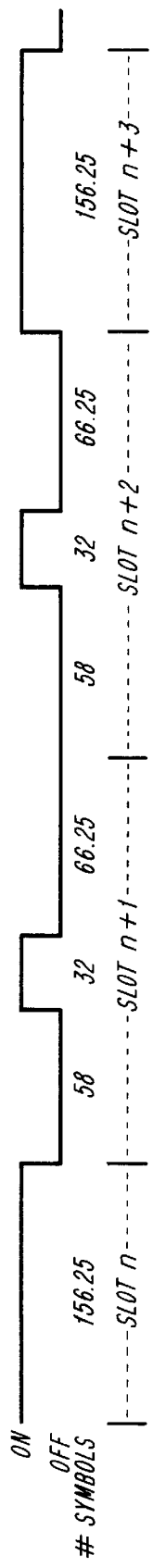
FIG. 9 is a graphical representation of transmitter power for a transmitter operating according to an embodiment of the present invention.

Referring now to FIG. 9, a graphical representation of the transmitter activity of the control station in an exemplary system using the method of the present invention is shown. In slots n+1 and n+2, the transmitter is switched on only to transmit, in this example, 32 symbols (the training sequence and tail bits), and is switched off during the remainder of the burst. In contrast, in slots n and n+3, the transmitter is on during the entire burst to transmit both fine synchronization information and additional control information (e.g., paging and access grant information). It will be appreciated that other transmitter activity patterns can result depending upon the length of the training sequence in a given application of the present invention.

Figure 10A:
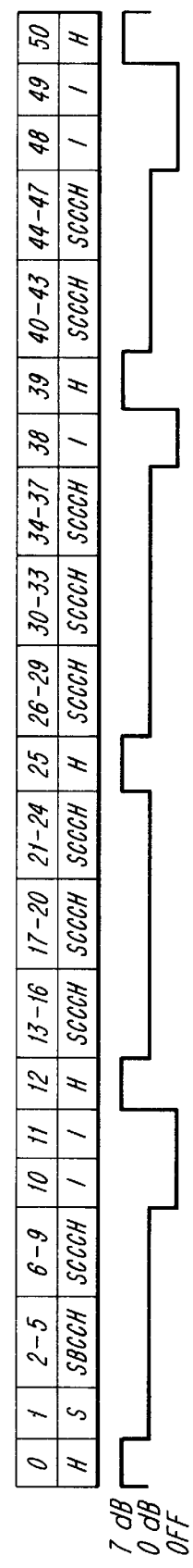
FIGS. 10A–B are graphical representations of carrier output power for time slot 0 of the control channel of FIG. 6 in a conventional system and according to an embodiment of the present invention, respectively.
Figure 10B:
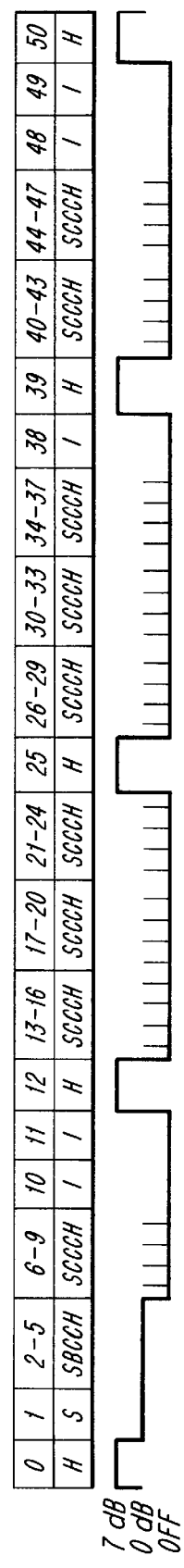

Referring now to FIGS. 10A–B, graphical representations of the output power of timeslot 0 of a satellite system control channel carrier (as shown in FIG. 6) in a conventional satellite-based mobile communication system, and in a satellite-based mobile communication system using the method of the present invention, respectively, are shown. As can be seen in FIG. 10A, the conventional satellite system always provides valid data for all bursts on timeslot 0 to allow mobile units to achieve and maintain fine synchronization. As a result, power is consumed unnecessarily. As can be seen in FIG. 10B, during SCCCH bursts when no paging or access grant information is necessary, abbreviated bursts are transmitted to maintain fine synchronization, and the output power is reduced substantially.

While the foregoing description has included many details and specificities, it is to be understood that these are for illustrative purposes only, and are not to be construed as limitations of the present invention. Numerous modifications will be readily apparent to those of ordinary skill in the art which are well within the scope of the invention, as defined by the following claims and their legal equivalents.

What is claimed is:

1. A method for maintaining synchronization between a control station and a transmitter/receiver in a TDMA communications system, comprising the steps of:

establishing a TDMA communications link between the control station and the transmitter/receiver, the TDMA communications link including at least one control channel for carrying control bursts, each control burst including synchronization information, and selectively including additional control information; and transmitting abbreviated control bursts over the at least one control channel during intervals when the additional control information is not required, the abbreviated control bursts including the synchronization information and not including the additional control information.

2. The method of claim 1, wherein the control station is a satellite, and the transmitter/receiver is a mobile telephone unit.

3. The method of claim 1, wherein the additional control information includes paging information, access grant information, or both paging information and access grant information.

4. The method of claim 1, wherein the at least one control channel includes a common control channel.

5. The method of claim 1, wherein the control bursts and abbreviated control bursts further include tail bits.

6. The method of claim 1, wherein the control bursts and abbreviated control bursts are transmitted during a time slot of the TDMA communications link.

7. A method of exchanging communication signals between a first communication device and a second communication device, comprising the steps of:

establishing a communications link between the first communication device and the second communication device, the communications link including at least one control channel for exchanging first and second types of control information between the first communication device and the second communication device during first and second intervals, respectively; and selectively providing transmitter power for transmitting over the at least one control channel such that transmitter power is provided during the first intervals, and not provided during the second intervals, when the second type of control information is not required.

8. The method of claim 7, wherein the first communication device is a satellite and the second communication device is a mobile telephone unit.

9. The method of claim 7, wherein the communications link is a TDMA communications link.

10. The method of claim 7, wherein the at least one control channel includes a common control channel.

11. The method of claim 7, wherein the first types of control information include synchronization information and the second types of information include paging information or access grant information.

12. The method of claim 8, wherein a first and a second interval are included within a time slot of the TDMA communications link.

13. A communication system, comprising:

a first communication device;

a second communication device;

means for establishing a communications link between the first and second communication device, the communications link including at least one control channel for transmitting intervals of control information from the first communication device to the second communication device, each interval including first types of control information and selectively including second types of control information; and transmission power means for selectively providing transmission power for each interval of control information when the first and second types of control information are required and for selectively providing transmission power for abbreviated intervals of control information when the second types of control information are not required, each abbreviated interval including only the first types of control information.

14. The system of claim 13, wherein the first communication device is a satellite and the second communication device is a mobile telephone unit.

15. The system of claim 13, wherein the communications link is a TDMA communication link and the at least one control channel is a common control channel.

16. The system of claim 15, wherein the TDMA communication link is specified according to the GSM standard.

17. The system of claim 15, wherein each interval and each abbreviated interval occur within a time slot of the TDMA communication link.

18. The system of claim 13, wherein the first types of control information include synchronization information, and the second types of information include paging information or access grant information.

19. The system of claim 17, wherein during each interval, the first and second types of information are defined by tail bits and wherein during each abbreviated interval, the first types of information are defined by tail bits.

* * * * *